US010329032B2

(12) United States Patent
Michel et al.

(10) Patent No.: US 10,329,032 B2
(45) Date of Patent: Jun. 25, 2019

(54) POWER MANAGEMENT AND DISTRIBUTION SYSTEM

(71) Applicant: HS Elektronik Systeme GmbH, Noerdlingen (DE)

(72) Inventors: Alexander Michel, Noerdlingen (DE); Jeff Wavering, Rockford, IL (US)

(73) Assignee: HS ELEKTRONIK SYSTEME GMBH, Noerdlingen (DE)

( * ) Notice: Subject to any disclaimer, the term of this patent is extended or adjusted under 35 U.S.C. 154(b) by 182 days.

(21) Appl. No.: 15/364,336

(22) Filed: Nov. 30, 2016

(65) Prior Publication Data

US 2017/0158350 A1 Jun. 8, 2017

(30) Foreign Application Priority Data

Dec. 4, 2015 (DE) .................. 10 2015 121 182

(51) Int. Cl.
| | | |
|---|---|---|
| H02J 1/00 | (2006.01) | |
| H02J 3/00 | (2006.01) | |
| B64D 47/02 | (2006.01) | |
| H02M 3/04 | (2006.01) | |
| H02M 7/04 | (2006.01) | |
| H02J 4/00 | (2006.01) | |

(52) U.S. Cl.
CPC ............... B64D 47/02 (2013.01); H02J 1/00 (2013.01); H02J 4/00 (2013.01); H02M 3/04 (2013.01); H02M 7/04 (2013.01)

(58) Field of Classification Search
CPC . B64D 47/02; H02M 3/04; H02M 7/04; H02J 4/00; H02J 1/00
See application file for complete search history.

(56) References Cited

U.S. PATENT DOCUMENTS

| | | |
|---|---|---|
| 8,536,730 B2 | 9/2013 | Rozman et al. |
| 8,704,574 B2 | 4/2014 | Prabhuk et al. |
| 8,716,997 B2 | 5/2014 | Rao et al. |
| 8,829,826 B2 | 9/2014 | Rozman et al. |
| 2005/0185352 A1* | 8/2005 | Nguyen .................... H02J 1/10 361/90 |

(Continued)

FOREIGN PATENT DOCUMENTS

| | | |
|---|---|---|
| EP | 2654154 A2 | 10/2013 |
| WO | 2006024005 A2 | 3/2006 |

OTHER PUBLICATIONS

European Search Report for Application No. 16200392.5-1804, dated May 26, 2017, 10 pages.

*Primary Examiner* — Alfonso Perez Borroto
*Assistant Examiner* — Esayas G Yeshaw
(74) *Attorney, Agent, or Firm* — Cantor Colburn LLP

(57) ABSTRACT

A power management and distribution system, including a power feed line configured to supply electric power of a given power feed line voltage, a plurality of loads to be supplied with power from the power feed line, each of the loads requiring power of a characteristic load voltage, and a plurality of solid state power controllers (SSPCs) connected between the power feed line and the plurality of loads, each of the solid state power controllers configured to selectively connect a respective load of the plurality of loads to the power feed line or to disconnect the respective load of the plurality of loads from the power feed line.

15 Claims, 1 Drawing Sheet

(56) References Cited

U.S. PATENT DOCUMENTS

| | | | |
|---|---|---|---|
| 2007/0268726 A1* | 11/2007 | Kojori | H02J 1/10 363/65 |
| 2008/0217471 A1* | 9/2008 | Liu | G05B 23/0213 244/1 R |
| 2009/0289691 A1* | 11/2009 | Fuller | H03K 17/166 327/432 |
| 2010/0172063 A1* | 7/2010 | Liu | H02H 1/04 361/118 |
| 2010/0246200 A1* | 9/2010 | Tessnow | G02B 6/0075 362/509 |
| 2011/0273010 A1 | 11/2011 | Tardy | |
| 2013/0229050 A1* | 9/2013 | Shipley | H02J 4/00 307/9.1 |
| 2013/0257153 A1 | 10/2013 | Krenz et al. | |
| 2014/0103990 A1* | 4/2014 | Holley | H03K 17/18 327/427 |
| 2014/0203639 A1 | 7/2014 | Rozman et al. | |
| 2014/0217821 A1 | 8/2014 | Rozman et al. | |
| 2015/0123463 A1 | 5/2015 | Huang et al. | |
| 2015/0311815 A1* | 10/2015 | Nedic | H02M 7/003 363/21.01 |

\* cited by examiner

POWER MANAGEMENT AND DISTRIBUTION SYSTEM

FOREIGN PRIORITY

This application claims priority to German Patent Application No. 10 2015 121 182.3 filed Dec. 4, 2015, the entire contents of which is incorporated herein by reference.

BRIEF DESCRIPTION

Embodiments of the invention relate to a power management and distribution system, and more particularly to a power management and distribution architecture to distribute power to various electric loads in a vehicle, e.g. in an aircraft.

Typically, in a vehicle like an aircraft loads need to be supplied by different voltage levels or type of voltages (AC or DC). Then, every individual load requires its own power supply to convert the feeder voltage supplied by a power source in the vehicle to the necessary voltage level or voltage type. In combination with SSPCs switching power to these loads, in the past, a plurality of SSPCs forming an SSPC module have been used to switch the feeder voltage to the loads as needed. Such SSPC modules comprise a plurality of SSPCs connected in parallel to the power feed line with each SSPC having an interface for connecting to the respective load. As the loads require different voltage levels or even different types of voltages, the usual power management and distribution architecture provided a dedicated power supply for each load connected in between the load interface of the respective SSPC in the SSPC module and the respective load. This architecture requires significant amount of different components leading to high weight, cost and required installation volume.

It would be beneficial to provide a more efficient power management and distribution system for supplying loads with different voltage levels.

SUMMARY

Embodiments of the invention provide a power management and distribution system, comprising a power feed line configured to supply electric power of a given power feed line voltage, a plurality of loads to be supplied with power from the power feed line, each of the loads requiring power of a characteristic load voltage, and a plurality of solid state power controllers (SSPCs) connected between the power feed line and the plurality of loads, each of the solid state power controllers configured to selectively connect a respective load of the plurality of loads to the power feed line or to disconnect the respective load of the plurality of loads from the power feed line. The power management and distribution system further comprises at least one power conversion module configured to convert electric power from the power feed line voltage to a specific load voltage required by at least one of the loads, the at least one power conversion module connected in between the power feed line and the solid state power controllers assigned to loads requiring the specific load voltage.

Further embodiments provide a solid state power controller module including a substrate having mounted thereon each of the power conversion modules and each of the solid state power controllers assigned to the respective power conversion module. Particularly, the solid state power controller module further may comprise at least one interface assigned to each of the solid state power controllers, the at least one interface configured to connect the respective solid state power controller to the load assigned to it. Particularly, the solid state power controller module further may comprise at least one interface for connection to the power feed line.

In particular, the power management and distribution system and the solid state power controller module is configured for managing and distributing electric power in an aircraft, particularly for managing and distributing electric power for lighting applications in an aircraft. Embodiments also provide an aircraft comprising the power management and distribution system or solid state power controller module.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
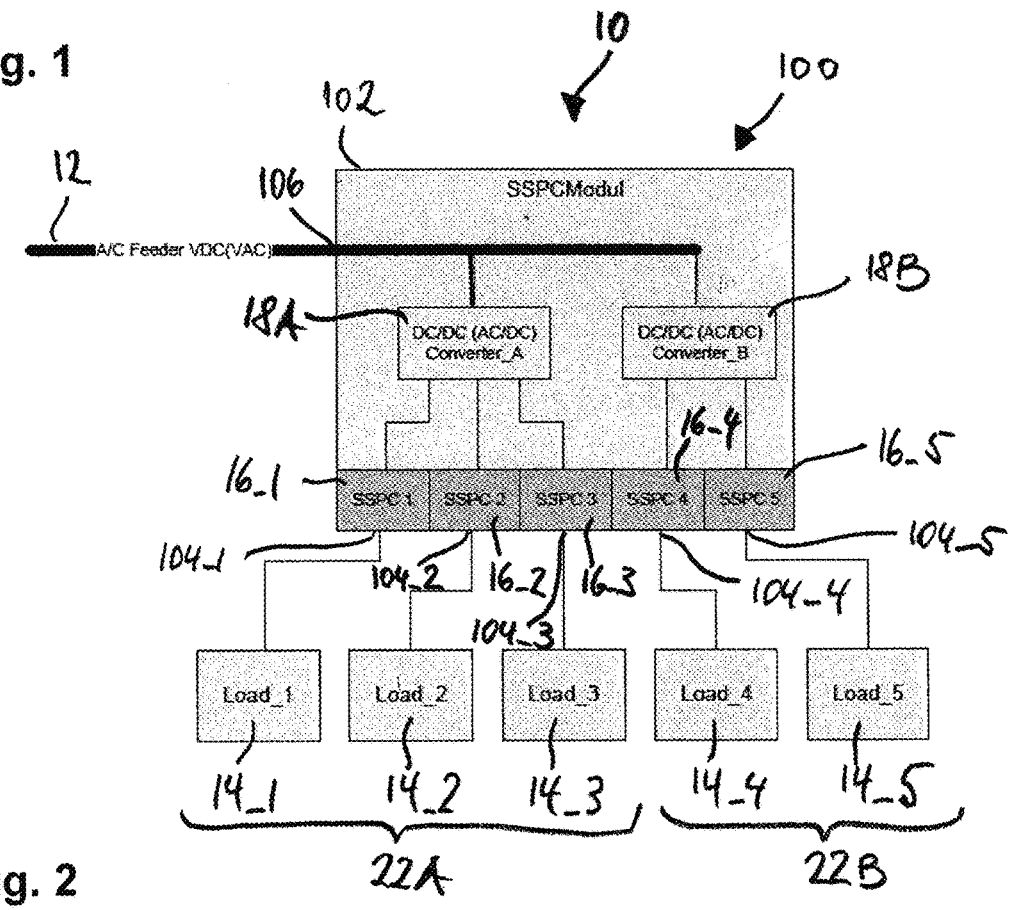
FIG. 1 illustrates a simplified block diagram of a power management and distribution architecture according to one embodiment.
Figure 2:
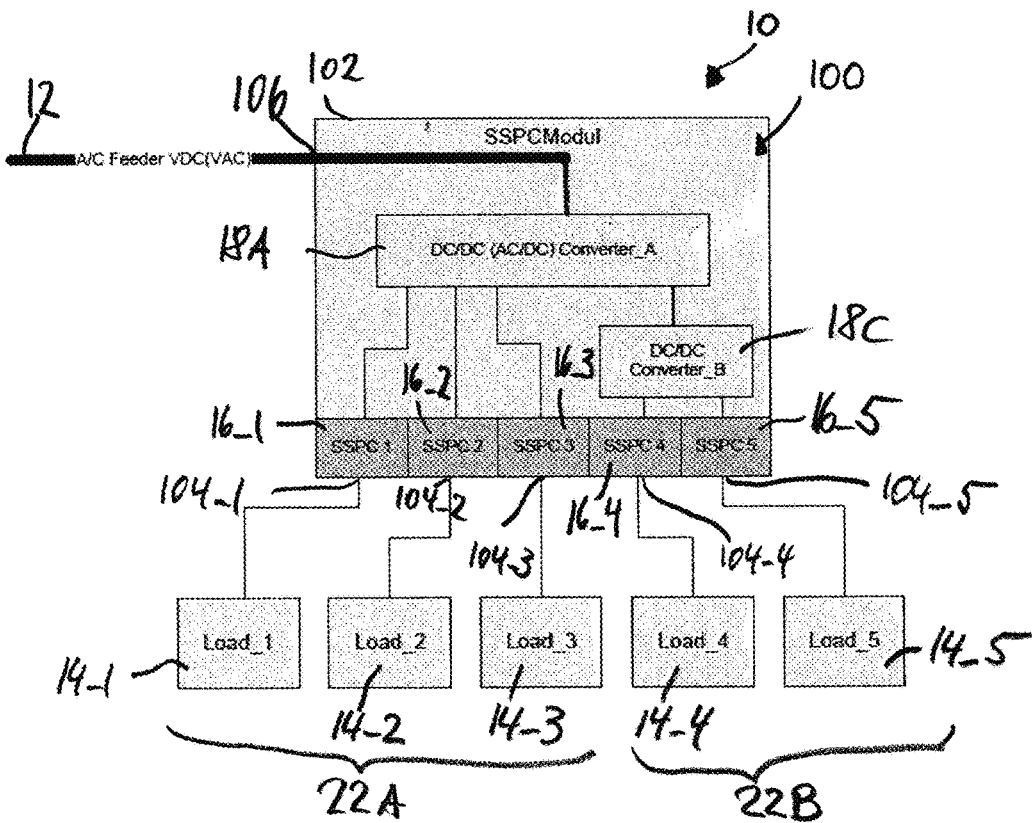
FIG. 2 illustrates a simplified block diagram of a power management and distribution architecture according to another embodiment.

Embodiments described herein relate to power management and distribution systems, generally indicated by 10 in FIGS. 1 and 2. The power management and distribution system 10 includes a power feed line 12 connected to a power supply (not shown), loads 14_1 to 14_5, and solid state power controllers (SSPCs) 16_1 to 16_5. SSPCs are used in power management and distribution systems to replace traditional electromechanical circuit breakers. The main function of an SSPC is to distribute power and to protect various electrical loads. In comparison to electromechanical devices, SSPCs provide a relatively fast response time, and may eliminate arcing during turn-off transient and bouncing during turn-on transient. SSPCs facilitate advanced protection and diagnostics, allowing for efficient power management and distribution architectures. SSPCs include power semiconductor devices that control power (voltage and/or current) supplied to a load. SSPCs perform supervisory and diagnostic functions in order to identify and prevent overload and short circuit conditions. Components of SSPCs may include power semiconductor switching devices, sensors to monitor output voltage and current and power semiconductor device temperature, and control circuitry. The control circuitry may include a microcontroller consisting of an arithmetic logic unit (ALU), memory, timer/counters, serial port, input/output (I/O) ports, and clock oscillator. Some SSPCs are programmable by a computer, user or by any proprietary method.

FIGS. 1 and 2 both show a power management and distribution system 10 comprising a power feed line configured to supply electric power of a given power feed line voltage and a plurality of loads to be supplied with power from the power feed line. Each of the loads 14_1 to 14_5 requires power of a characteristic load voltage. A plurality of solid state power controllers or SSPCs 16_1-16_5 is connected between the power feed line and the plurality of loads 14_1-14_5. Each of the solid state power controllers 16_1-

16_5 is configured to selectively connect a respective load of the plurality of loads 14_1-14_5 to the power feed line 12 or to disconnect the respective load of the plurality of loads 14_1-14_2 from the power feed line. The power management and distribution system further comprises at least one power conversion module (FIG. 1: 18A, 18B; FIG. 2: 18A, 18C) configured to convert electric power from the power feed line voltage to a specific load voltage required by at least one of the loads (14_1-14_3, 14_4-14_5). The at least one power conversion module (FIG. 1: 18A, 18B; FIG. 2: 18A, 18C) is connected in between the power feed line 12 and the solid state power controllers 16_1-16_3, 16_4-16_5 assigned to loads requiring the specific load voltage.

In the power management and distribution system 10 power received at each load 14_1 to 14_5 is adjusted by turning on and off SSPCs 16_1 to 16_5 connected in between the load 14_-1 to 14_5 and the power feed line 12. By controlling the SSPCs that are turned on and off, the power management and distribution system 10 can isolate inactive loads or faulty loads of the plurality of loads 14_1 to 14_5 from the power feed line 12, while continuing to provide power to functional loads of the plurality of loads 14_1 to 14_5. The power management and distribution system 10 comprises a solid state power controller module (SSPC module) 100. The basic concept of this power management and distribution system 10 is that an incoming feeder voltage is received by the SSPC module 100. The feeder voltage may be any voltage as typically used in the art. In particular, the feeder voltage may be any type of voltage, DC voltage or AC voltage, and may have any voltage level. In aircraft power distribution systems, typical feeder voltages include 28 V DC, 270 V DC, and 115 V/400 Hz AC. The power management and distribution system 10 is particularly configured for managing and distributing voltages of such voltage type and voltage level. One aspect of the power management and distribution system is, that within the SSPC module 100, the feeder voltage 12 gets converted to the voltage types and voltage levels needed for the various loads 14_1 to 14_5. Efficient DC/DC converters (e.g. as shown at 18C in FIGS. 1 and 2) and/or AC/DC converters (e.g. at 18A and 18B in FIGS. 1 and 2) may be provided for carrying out such conversion. In the embodiments shown herein, the power supply via power feed line 12 is combined with an SSPC module 100. The DC/DC converters and/or AC/DC converters 18A, 18B, 18C may be integrated in the SSPC module 100. The SSPC module 100 has interfaces to connect to the power feed line 12 and to the loads 14_1 to 14_5. Moreover, the SSPC module 100 supports the required components for converting the power of the power feed line 12 to the required voltage types and voltage levels as well as for connecting/disconnecting the loads to/from the power feed line 12. This reduces the number of individual components required dramatically, as only a specific number of the SSPC modules 100 are required. Moreover, the arrangement and architecture of the SSPC module 100 is such that the number of components to be arranged on a specific module 100 is at a minimum. Basically, with respect to the SSPCs 16_1 to 16_5 in the SSPC modules 100 power conversion takes place on the side of the power feed line 12, and not on the side of the loads 14_1 to 14_5 as was done in prior art power management and distribution systems. This allows a very efficient grouping of power conversion modules 18A, 18B, 18C with respect to the power supply requirements imposed by different loads 14_1 to 14_5, but still the power conversion is provided by the SSPC module 100, and interfaces 204_1 to 205_5 can be provided where the power to be supplied to each of the loads 14_1 to 14_5 can be delivered. Therefore, any supplier of a load does not have to take care about power supply requirements, as the required power can be taken from the respective interface of the SSPC module 100.

In particular embodiments, a plurality of power conversion modules can be connected in parallel to the power feed line 12, as shown by power conversion modules 18A and 18B in FIG. 1. Each of these power conversion modules 18A, 18B will typically deliver a different output voltage. For example, in the case of FIG. 1, power conversion modules 18A and 18B both are AC/DC converter modules, but the module 18A delivers a different DC output voltage than the module 18B. Moreover, the conversion of the power supplied by the power feed line 12 can be provided by power conversion modules arranged in a cascaded arrangement. In a cascaded arrangement two or more power conversion modules 18A, 18C are connected serially in between the power feed line 12 and the respective SSPCs 16_4, 16_5. One example is shown in FIG. 2 where a first power conversion module 18A is connected to the power feed line 12 and delivers its output voltage to a second power conversion module 18C. The second power conversion module 18C is connected to the output of the first power conversion module 18A and delivers a converted output voltage to SSPCs 16_4 and 16_5.

In the embodiments shown in FIGS. 1 and 2 each of the SSPCs 16_1 to 16_5 is assigned to one respective load 14_1 to 14_5. Thereby, a plurality of the loads 14_1 to 14_5 can share a common power conversion module 18A, 18B, 18C.

The grouped and cascaded arrangements shown exemplary in FIGS. 1 and 2 can be combined as desired, thereby arriving at combinations of cascaded and grouped arrangement of power conversion modules 18A, 18B, 18C as required. This allows an efficient conversion of a single AC voltage or DC voltage as delivered on power feed line 12 into a number of different output voltages as required by different loads 14_1 to 14_5. Also, multiple loads 14_1 to 14_5 can share one power supply voltage as supplied by power feed line 12. In an overall system architecture, this configuration helps saving weight, number of components, volume, and cost.

The term voltage as used herein refers to a general understanding. In particular, the term voltage is intended to include any different types of voltages, like AC voltage or DC voltage, as well as different voltage levels of a particular voltage type.

In particular embodiments, the power management and distribution system 10 may at least two power conversion modules, as shown at 18A, 18B in FIG. 1 or as shown at 18A, 18C in FIG. 2. The at least two power conversion modules produce different load voltages, as required by different loads. Each of the at least two power conversion modules (FIG. 1: 18A, 18B; FIG. 2: 18A, 18C) is connected to a corresponding group 22A, 22B of the solid state power controllers 16_1-16_3, 16_4-16_5. Each group 22A, 22B of the solid state power controllers ist assigned to loads requiring the specific load voltage produced by the that power conversion module 18A, 18B, 18C. Particularly, the arrangement of power conversion modules may be such that there is only one power conversion module 18A, 18B, 18C for each load voltage required by the loads 14_1 to 14_5. In other words, each group 22A, 22B of the solid state power controllers may include each of the solid state power controllers 16_1-16_3, 16_4-16_5 assigned to loads requiring the specific load voltage produced by the respective power conversion module 18A, 18B, 18C) connected to the group. Thereby, redundancy can be avoided or at least suppressed efficiently.

In particular, all solid state power controllers 16_1-16_3, 16_4-16_5 in a respective group 22A, 22B may be arranged adjacent to each other. Thereby, a simple configuration of the power conversion stages and the output stage is achievable.

In the embodiment shown in FIG. 1, two power conversion modules 18A and 18B are connected parallel to each other between the power feed line 12 and the respective groups of solid state power controllers 16_1-16_3 and 16_4-16_5.

The embodiment shown in FIG. 2 comprise at least one first stage power conversion module 18A and at least one second stage power conversion module 18C. The first stage power conversion module 18A is connected in between the power feed line 12 and the second stage power conversion module 18C. The second stage power conversion module 18C is connected in between the first stage power conversion module 18A and the group of solid state power controllers 16_4-16_5 assigned to loads 14_4-14_5 requiring the voltage supplied by the second stage power conversion module 18C. The first stage power conversion module 18A delivers its output voltage as well to a group of solid state power controllers 16_1 to 16_3 requiring the voltage supplied by the first stage power conversion module 18A.

The cascaded arrangement of power conversion modules as shown in FIG. 2 can be cascaded even further by by adding further stages of power conversion modules, as desired. A respective further stage power conversion module will be connected in between the respective previous stage power conversion module and the group of solid state power controllers assigned to loads requiring the voltage supplied by the further stage power conversion module. For example, a third stage power conversion module may be connected in between the second stage power conversion module 18C and the group of solid state power controllers assigned to loads requiring the voltage supplied by the third stage power conversion module.

In the embodiments shown in FIGS. 1 and 2 the power feed line 12 provides an AC voltage and the power conversion module 18A and 18B includes an AC/DC converter. In FIG. 1, the power conversion module includes two AC/DC converters 18A and 18B connected in parallel. In FIG. 2, the power conversion module includes a first stage AC/DC converter 18A and a second stage DC/DC converter 18B, thereby supplying two DC voltages of different voltage level to the solid state power controllers 16_1 to 16_5.

As shown in FIGS. 1 and 2, the power management and distribution system 10 comprises a solid state power controller module 100. The solid state power controller module includes a common substrate 102. Each of the power conversion modules 18A and 18B (FIG. 1) or 18A and 18C (FIG. 2) is mounted to the substrate 102. Moreover, each of the solid state power controllers 16_1-16_5 assigned to the respective power conversion module (18A or 18B in FIG. 1, 18A or 18C in FIG. 2) is mounted to the substrate as well. The solid state power controller module 100 further comprises at least one interface 104_1-104_5 assigned to each of the solid state power controllers 16_1-16_5. Five solid state power controllers 16_1 to 16_5 are shown in FIGS. 1 and 2, and therefore there are five interfaces 104_1 to 104_2, however the number five is merely exemplary and there may be much more than five solid state power controllers and much more that five interfaces. Each of the interfaces 104_1-104_5 is configured to connect the respective solid state power controller 16_1-16_5 to the load 14_1-14_5 assigned to it. Moreover, the solid state power controller module 100 further comprises at least one further interface 106 for connection to the power feed line 12.

The power management and distribution system 10 is configured for managing and distributing electric power in an aircraft, particularly for managing and distributing electric power for lighting applications in an aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power management and distribution system, comprising
    a power feed line configured to supply electric power of a given power feed line voltage,
    a plurality of loads to be supplied with power from the power feed line, each of the loads requiring power of a characteristic load voltage,
    a plurality of solid state power controllers (SSPCs) connected between the power feed line and the plurality of loads, each of the solid state power controllers configured to selectively connect a respective load of the plurality of loads to the power feed line or to disconnect the respective load of the plurality of loads from the power feed line;
    wherein the power management and distribution system further comprises at least one power conversion module configured to convert electric power from the power feed line voltage to a specific load voltage required by at least one of the loads, the at least one power conversion module connected in between the power feed line and the solid state power controllers assigned to loads requiring the specific load voltage; and
    a solid state power controller module including a substrate having mounted thereon each of the power conversion modules and each of the solid state power controllers assigned to the respective power conversion module.

2. The power management and distribution system according to claim 1, comprising at least two power conversion modules producing different load voltages, each of the at least two power conversion modules being connected to a corresponding group of the solid state power controllers assigned to loads requiring the specific load voltage produced by the that power conversion module.

3. The power management and distribution system according to claim 2, wherein the group of the solid state power controllers includes each of the solid state power controllers assigned to loads requiring the specific load voltage produced by the respective power conversion module connected to the group.

4. The power management and distribution system according to claim 3, wherein all solid state power controllers in a respective group are arranged adjacent to each other.

5. The power management and distribution system according to claim 2, wherein the at least two power conversion modules are connected parallel to each other between the power feed line and the respective groups of solid state power controllers.

6. The power management and distribution system according to claim 1, further comprising: at least one first stage power conversion module and at least one second stage power conversion module, the first stage power conversion module being connected in between the power feed line and the second stage power conversion module, the second stage power conversion module being connected in between the first stage power conversion module and the group of solid state power controllers assigned to loads requiring the voltage supplied by the second stage power conversion module.

7. The power management and distribution system according to claim 6, comprising at least one further stage power conversion module being connected in between the previous stage power conversion module and the group of solid state power controllers assigned to loads requiring the voltage supplied by the further stage power conversion module.

8. The power management and distribution system according to claim 1, wherein the power feed line provides an AC voltage and the power conversion module includes an AC/DC converter.

9. The power management and distribution system according to claim 8, wherein the AC/DC converter is provided as a first stage power conversion module.

10. The power management and distribution system according to claim 9, further comprising a DC/DC converter as the second or further stage power conversion module.

11. The power management and distribution system according to claim 1, wherein the solid state power controller module further comprises at least one interface assigned to each of the solid state power controllers, the at least one interface configured to connect the respective solid state power controller to the load assigned to it.

12. The power management and distribution system according to claim 1, wherein the solid state power controller module further comprises at least one interface for connection to the power feed line.

13. The power management and distribution system according to claim 1, in combination with and being managing and distributing electric power for lighting applications in an aircraft.

14. An aircraft comprising the power management and distribution system according to claim 13.

15. A solid state power controller module for a power management and distribution system comprising a power feed line configured to supply electric power of a given power feed line voltage, and a plurality of loads to be supplied with power from the power feed line, each of the loads requiring power of a characteristic load voltage, the solid state power controller module including a substrate having mounted thereon:
a plurality of solid state power controllers (SSPCs) connected between the power feed line and the plurality of loads, each of the solid state power controllers configured to selectively connect a respective load of the plurality of loads to the power feed line or to disconnect the respective load of the plurality of loads from the power feed line; and
at least one power conversion module configured to convert electric power from the power feed line voltage to a specific load voltage required by at least one of the loads, the at least one power conversion module connected in between the power feed line and the solid state power controllers assigned to loads requiring the specific load voltage.

* * * * *